United States Patent
Russell

[15] 3,691,413
[45] Sept. 12, 1972

[54] METHOD AND MEANS FOR STARTING HIGH INERTIA MOTORS

[72] Inventor: James G. Russell, Pittsburgh, Pa.
[73] Assignee: Westinghouse Electric Corporation, Pittsburgh, Pa.
[22] Filed: April 16, 1970
[21] Appl. No.: 29,169

[52] U.S. Cl. ............310/41, 310/74, 310/112, 310/162, 74/572
[51] Int. Cl. ............................H02k 7/10
[58] Field of Search.......310/41, 74, 68 B, 164, 68 E, 310/163, 77, 162, 112, 79, 80, 96, 100, 75, 157, 75 A, 75 B, 75 C, 153, 70, 49, 114; 74/572; 318/161

[56] References Cited

UNITED STATES PATENTS

| 1,040,863 | 1/1912 | Blaxter | 318/161 |
| 1,048,985 | 1/1912 | Marburg | 318/161 |
| 2,656,733 | 10/1953 | Dicke | 74/572 |
| 2,914,962 | 12/1959 | Schmidt | 74/572 |
| 3,067,370 | 12/1962 | Quittner | 310/41 |
| 3,450,911 | 6/1969 | Smith | 318/161 |

Primary Examiner—D. F. Duggan
Assistant Examiner—R. Skudy
Attorney—A. T. Stratton, Z. L. Dermer and M. B. L. Hepps

[57] ABSTRACT

The motor associated with a high inertia flywheel is started with the flywheel disconnected therefrom. A separate device is utilized to bring the flywheel to the speed of the motor, which device comprises a stator coil mounted integral with the flywheel and concentric with a rotor coil which is mounted integral with a shaft extending from the motor. Coupling bars are also provided internal of the flywheel for positively locking the flywheel to the motor shaft extension when same is brought to synchronous speed therewith.

4 Claims, 1 Drawing Figure

PATENTED SEP 12 1972 3,691,413
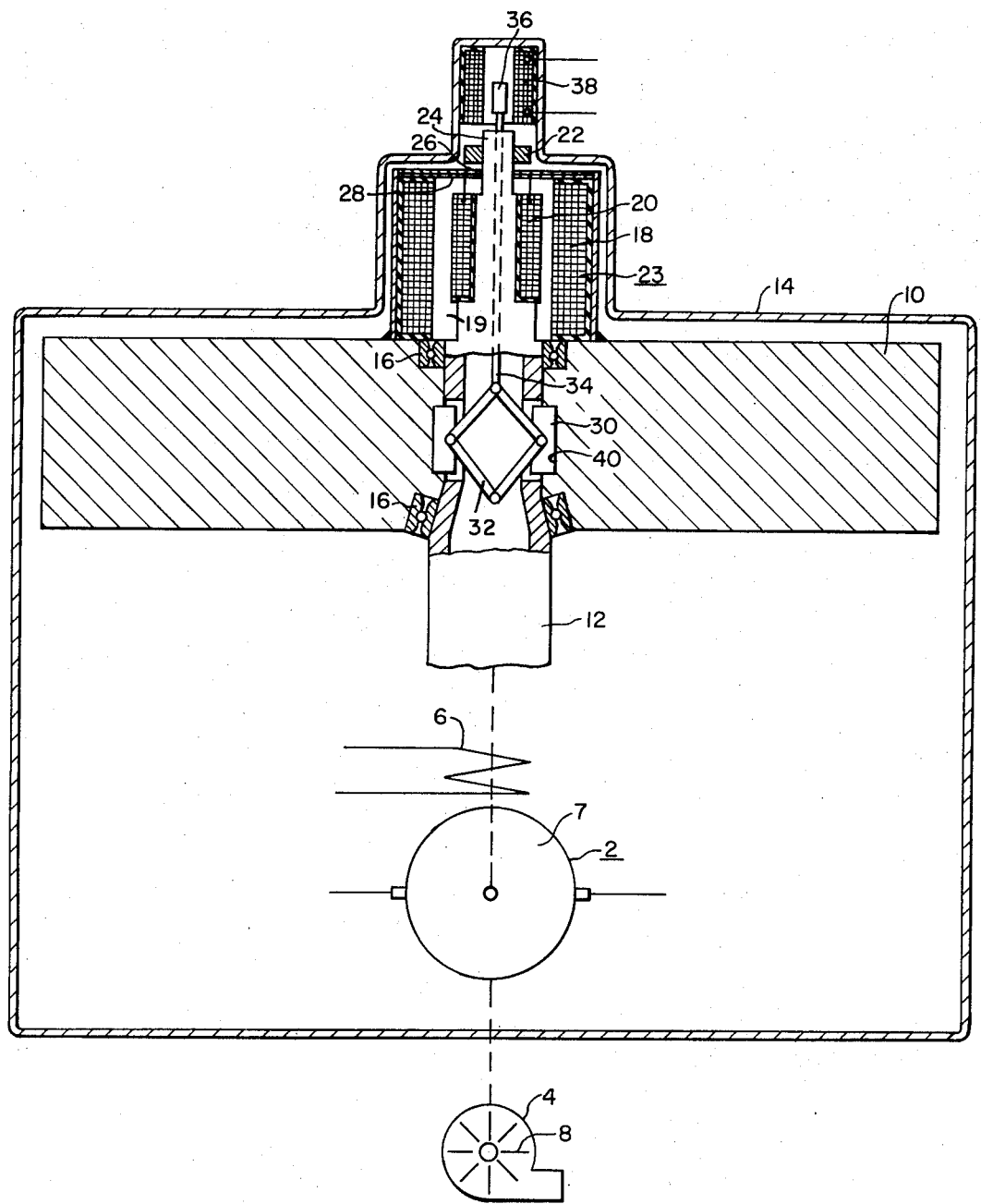
WITNESSES
Theodore F. Wrobel
James E. Young
INVENTOR
James G. Russell
BY
ATTORNEY

METHOD AND MEANS FOR STARTING HIGH INERTIA MOTORS

BACKGROUND OF THE INVENTION

This invention pertains to motors having high inertia flywheels associated therewith and more particularly to a method and means for starting such motors.

In the design of a motor having a high inertia flywheel associated therewith, as for example, the coolant pump motor for a nuclear reactor plant, one of the most significant considerations is the starting conditions for the motor. The starting conditions are now largely dictated by the size of the motor flywheel. In the case of reactor coolant pump motors, constantly increasing flywheel inertia requirements to guarantee sufficient flow coastdown in the event of a loss of pump motor power now dictate that the pump motor be overly large in order to effectively start the pump with the large flywheel load. Some present flywheel requirements dictate the use of an extremely expensive two speed motor because of the inrush currents and motor heating during acceleration of the flywheel.

SUMMARY OF THE INVENTION

The requirements for starting a motor having a high inertia flywheel associated therewith can be effectively reduced by starting the motor disconnected from the flywheel, then bringing the flywheel up to speed by utilizing an auxiliary device over a substantial time, synchronizing the motor and flywheel speeds and mechanically locking the two together. The motor is designed to match the load requirements alone, and the flywheel inertia may be effectively increased to any desirable size.

In accordance with this invention, the flywheel may be mounted on the motor shaft on a set of bearings. The flywheel will not load the motor until mechanically locked to the shaft after speed synchronization. After locking, the flywheel and the motor act exactly as in prior art single unit designs.

One example of the mechanical locking device is a set of locking bars mounted in a retracted position in the motor shaft inside the flywheel hub. The locking bars are extended to engage slots in the flywheel when the two are at the same speed. The locking bars are held retracted until synchronization by a linkage connected to a permanent magnet solenoid or the equivalent thereof. Thus, during normal operation there are no wearing surfaces. In addition, the linkage may be designed so that the locking bars remain engaged by centrifugal force and are not retracted until the unit is at rest.

The flywheel starting device may be one of many devices which imparts energy slowly to the flywheel bringing it up to motor synchronous speed in a relatively long period of time, such as 10 to 15 minutes. For example, a small direct current electric motor with a gear wheel engaging the flywheel through a Bendix starter type engaging unit may be used to accelerate the flywheel with for example a manual or automatic speed controller. Or, the stator coil of an electric motor may be wound on an integral part of the flywheel with its rotor wound on an extension of the motor shaft. In that event, the commutator is wired so that applied power acts as a brake bringing the shaft and flywheel to the same speed.

DESCRIPTION OF THE DRAWING

For a better understanding of the invention, reference may be had to the accompanying drawing which shows an exemplary embodiment of a flywheel starting device and synchronization system.

DESCRIPTION OF THE PREFERRED EMBODIMENT

Referring to the drawing, there is shown an electric motor 2 of the type which can be conveniently used to drive a pump 4. The motor 2 generally comprises a stator 6 and a rotor 7 wound on a shaft 12. The shaft 12 extends on one side of the motor 2, to a pump impeller, 8, in this example. The motor shaft 12 extends on the side opposite the pump 4 to a flywheel 10. The flywheel 10 is supported within a housing 14 which forms an extension of the motor housing 9. The flywheel 10 is utilized to maintain pump pressure and to provide an adequate coastdown in the event of a loss of electric power to the motor 2.

The flywheel 10 is not directly attached to the motor shaft but is rather supported on bearings 16 so that the shaft may rotate essentially free of the flywheel. Thus, in starting the motor 2, the inertia load of the flywheel 10 is not carried thereby. Attached to and integral with the flywheel is a stator coil 18. A portion 19 of the motor shaft 12 extends beyond the flywheel and has a rotor coil 20 wound thereon. A commutator 22 is affixed to an extended portion 24 of the motor shaft for rotary motion therewith and has contact points 26 which are biased to contact extension 28 electrically connected to the stator coil 18.

As previously explained, the motor is started with the flywheel 10 disconnected therefrom. Thus the motor need only be designed to carry its own load, as for example a pump.

After the motor and pump have been brought to speed, the auxiliary electric motor 23 comprising a rotor 20, a stator 18, and commutator 22 is energized so as to bring the flywheel to the speed of the shaft over a substantial period of time, for example, 15 minutes. Because of the allowable period of time for bringing the flywheel to speed, the motor 23 need not generate much power. The commutator 22 may then be wired so that the power applied would act as a break bringing the rotor 20 and the stator 18 to the same speed, as is well known in the motor art.

In order to then lock the flywheel to the motor shaft extension 12, locking bars 30 are provided which are normally mounted within that portion of the motor shaft 12 inside of the hub of the flywheel 10. The locking bars 30 are held retracted until synchronization by a linkage 32 connected by a push pull rod 34 extending, for example, to a solenoid core 36. The housing 14 carries a solenoid coil 38 which cooperates with the solenoid core 36, in a well known manner, so as to extend or retract the linkage 32. The hub of the flywheel 10 contains a plurality of slots 40 into which the locking bars 30 may be inserted. In addition, the linkage 32 is designed so that the locking bars are aided in remaining in engaged position by centrifugal force and cannot be retracted until the unit is at rest. Thus, once the locking bars 30 are engaged in the slots 40 in the hub of the flywheel 10 the motor shaft 12 and flywheel 10 are essentially a single unit which cannot be disengaged until the flywheel has served its intended purpose to insure a long rundown upon the loss of power or other accident.

Therefore, I claim:

1. A process for starting motors having a motor shaft and having high inertia flywheels associated therewith, said process including:
   decoupling the flywheel from the motor shaft;
   starting the motor and bringing same to operating speed;
   bringing said flywheel to said operating speed by an auxiliary motor means;
   recoupling the flywheel to the motor shaft.

2. The precess of claim 1 including recoupling the flywheel to the motor shaft only when the speeds thereof are synchronized.

3. A high inertia motor comprising, in combination:
   a motor having a shaft extending some distance beyond the motor on both ends thereof;
   one end of said shaft coupled to a load;
   a high inertia flywheel concentric with the other end of said shaft;
   bearings supporting the flywheel for rotary motion relative to said other end of said shaft;
   auxiliary motor means associated with said flywheel for producing rotary motion of said flywheel,
   including a commutator operably associated with said auxiliary motor for synchronizing the speed of the flywheel with the speed of said shaft; and
   linkage means for locking the flywheel to the shaft.

4. The motor of claim 3 wherein the auxiliary motor means for producing rotary motion of the flywheel includes an electrical rotor coil mounted integral with said shaft and a stator coil mounted integral with said flywheel, said stator coil being concentric with said rotor coil.

* * * * *